(No Model.)
J. O. HYMER.
VETERINARY MOUTH SPECULUM.
No. 585,101. Patented June 22, 1897.
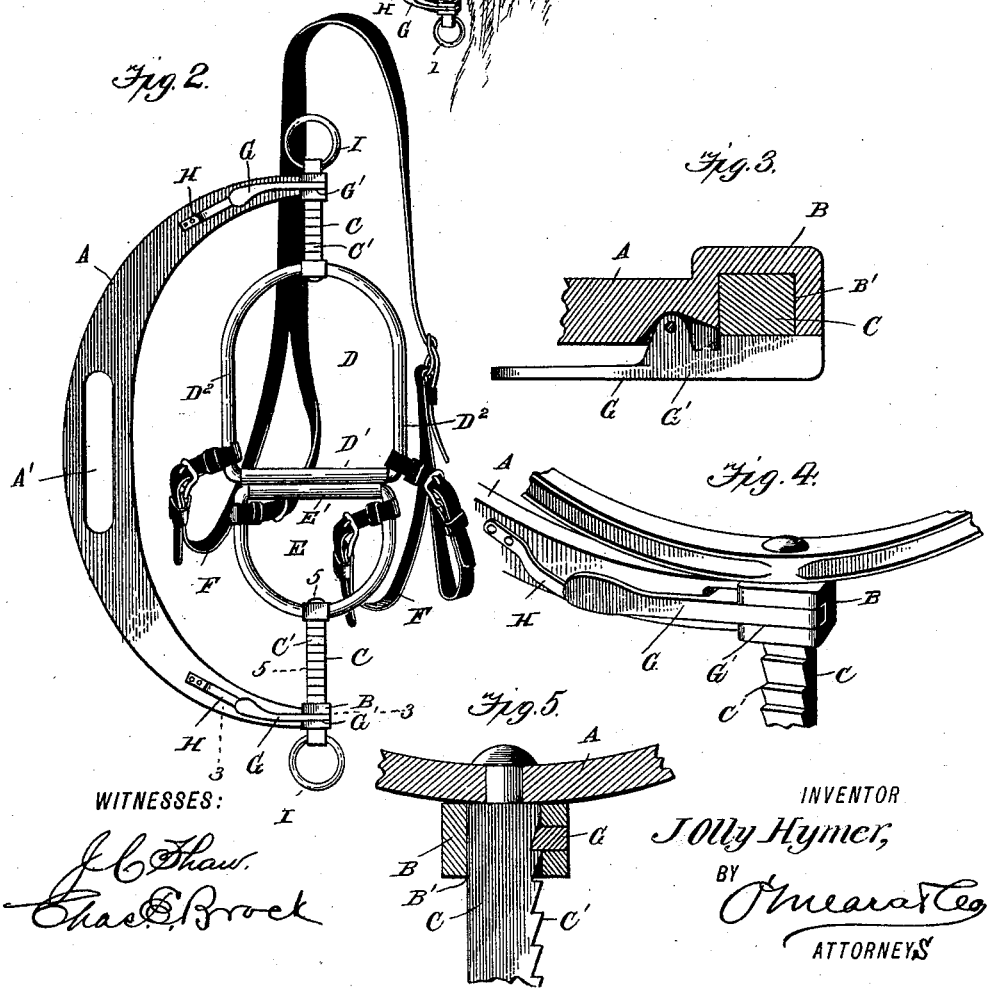
WITNESSES:
INVENTOR
J. Olly Hymer,
BY
ATTORNEYS

UNITED STATES PATENT OFFICE.

J OLLY HYMER, OF CONCORDIA, MISSOURI.

VETERINARY MOUTH-SPECULUM.

SPECIFICATION forming part of Letters Patent No. 585,101, dated June 22, 1897.

Application filed July 30, 1896. Serial No. 601,053. (No model.)

*To all whom it may concern:*

Be it known that I, J OLLY HYMER, residing at Concordia, in the county of Lafayette and the State of Missouri, have invented a new and Improved Mouth-Speculum, of which the following is a specification.

This invention relates generally to veterinary surgical instruments, and more particularly to a mouth-speculum adapted for use for horses, cows, or any other animal.

The object of this invention is to provide an exceedingly cheap and simple speculum which can be applied and adjusted to the mouth of the animal without hurting or injuring the same; and a still further object is to provide a speculum which can be applied to the mouth of the animal and connected with a bridle-strap, by means of which the complete control of the animal is obtained.

Another object of my invention is to provide a speculum in which the supporting bow or yoke can be turned from one side of the head to the other without removing the speculum from the mouth.

With these various objects in view my invention consists, essentially, of a supporting bow or yoke, the upper and lower jaws adapted to hold the upper and lower jaws of the animal apart, the adjusting-pins attached to said upper and lower jaws and passing through the upper and lower ends of the yoke, and means for securing them in their adjusted positions.

My invention consists also in certain details of construction and novelties of combination, all of which will be fully described hereinafter and pointed out in the claims.

In the drawings forming a part of this specification, Figure 1 is a view showing my invention as applied and used. Fig. 2 is a view showing the speculum detached. Fig. 3 is a sectional view on the line 3 3 of Fig. 2. Fig. 4 is an enlarged detail view of the lower jaw, showing its connection with the adjusting-pin and the supporting bow or yoke. Fig. 5 is a section on line 5 5 of Fig. 2.

In carrying out this invention I employ a supporting bow or yoke A, which is made of strong light material and is essentially semicircular in shape, said bow being cut out, as shown at A', thereby making it lighter and also providing a convenient hand-grip in manipulating the device. Bosses B are formed upon the upper and lower ends of the bow or yoke, said bosses having a square aperture B' produced therein, and working through these apertures are the adjusting-pins C, polygonal shape in cross-section, to slide freely in the aperture-bosses and having notches or ratchet-teeth C' upon one face.

The upper jaw D is swiveled to the lower end of the pin C and the lower jaw E is swiveled to the upper end of the lower adjusting-pin. The upper jaw D consists of a horizontal bar or bit D' and the side bars D², which extend upward and are shaped to meet each other at the center, where the adjusting-pin is swiveled.

The lower jaw comprises a horizontal bar E', and the side bars unite where the lower pin is swiveled. The bars D' and E' virtually constitute bits and are covered with rubber or leather to prevent injury to the gums or teeth of the animal.

Bridle-straps F are attached to the side bars of both the upper and lower jaws where they meet the horizontal bars or bits, and by means of these bridle-straps the surgeon has complete control of the animal, whether it be standing or cast.

Catch-levers G are pivoted at the upper and lower ends of the bow or yoke and work through openings G', produced in the bosses B, and are adapted to engage the notched or ratchet face of the adjusting-pins, and by means of which the said pins are locked in any adjusted position, and inasmuch as these pins serve to open and close the jaws it is clear that the jaws will also be held in any adjusted position.

Springs H are attached to the bow or yoke and bear beneath the free ends of the levers G for the purpose of holding the opposite ends in contact with the adjusting-pins.

Operating-rings I are attached to the upper and lower ends of the upper and lower adjusted pins, respectively, and by means of which the surgeon or operator raises the upper and lower jaws.

Now in operation the speculum is applied to the horse in substantially the same manner as the bridle is applied thereto—that is, the bits or horizontal bars are placed between the teeth when said bars or bits are in their central position, as shown in Fig. 2. The spring-lever is then discharged from the upper or lower bar and the jaw moved up or down by means of the operating-ring and adjusting-pin. The other jaw is then operated upon in substantially the same manner. By this arrangement the jaws of the animal can be instantly opened to the desired extent, and as the speculum is placed in the fore part of the mouth it is clear that the surgeon or operator has ample room for operating upon either the teeth, mouth, or throat of the animal. By means of the bridle-strap the animal can be led about or moved as desired, and whenever it is desired to move the bow or yoke from one side of the head to the other it can be readily swung around in front of the nose, inasmuch as the adjusting-pins are swiveled to the upper and lower jaws, and as the bosses through which said adjusting-pins pass have polygonal-shaped apertures, in which the adjusting-pins snugly fit, it is clear that the pins will be carried around with the yoke, so that the catch-levers will always engage the notched or ratchet faces of the said pins.

It will thus be seen that I have provided an exceedingly cheap and simple construction of mouth-speculum which can be quickly and easily applied to an animal either while standing or cast, and one which can be quickly adjusted to any desired position, and one in which the supporting bow or yoke can be swung around in front of the nose from one side of the head to the other.

Having thus described my invention, what I claim as new, and desire to secure by Letters Patent, is—

1. In a veterinary speculum, the combination with the supporting bow or yoke, of the upper and lower jaws, having the upper and lower bits or bars covered with leather or rubber, the sliding pins, pivotally connected to the said jaws, and passing through the upper and lower ends of the supporting bow or yoke, and the spring-actuated lever-catches adapted to secure said adjusting-pins, substantially as shown and described.

2. In a veterinary speculum, the combination with the supporting bow or yoke, having bosses at its upper and lower ends, said bosses having polygonal apertures therein, the sliding pins working in the said apertures, and polygonal shape in cross-section, and snugly fitting therein; said pins having their faces notched or ratcheted, the spring-actuated lever pivoted upon the lower ends of the bow or yoke, and adapted to engage the notched or ratchet face of the pins, the upper and lower jaws pivotally attached to the upper and lower pins, and the bridle-straps connected with the upper and lower jaws, substantially as shown and described.

JOLLY HYMER.

Witnesses:
F. W. VOGT,
AUG. F. DETERT.